United States Patent [19]

Beyers, Jr.

[11] Patent Number: 4,641,205
[45] Date of Patent: Feb. 3, 1987

[54] TELEVISION SYSTEM SCHEDULER WITH ON-SCREEN MENU TYPE PROGRAMMING PROMPTING APPARATUS

[75] Inventor: Billy W. Beyers, Jr., Hancock County, Ind.

[73] Assignee: RCA Corporation, Princeton, N.J.

[21] Appl. No.: 586,270

[22] Filed: Mar. 5, 1984

[51] Int. Cl.$^4$ .................... G11B 31/00; H04N 5/782
[52] U.S. Cl. .................................. 360/33.1; 358/335; 434/323
[58] Field of Search .................. 358/335, 191.1, 192.1, 358/193.1, 194.1; 360/33.1; 369/6–13; 364/143–147, 188–189; 434/322–323

[56] References Cited

U.S. PATENT DOCUMENTS

| | | | |
|---|---|---|---|
| 4,004,085 | 1/1977 | Makino et al. | 340/324 |
| 4,088,958 | 5/1978 | Suzuki et al. | 325/396 |
| 4,162,513 | 7/1979 | Beyers et al. | 358/191 |
| 4,325,081 | 4/1982 | Abe et al. | 364/144 |
| 4,390,902 | 6/1983 | Chin et al. | 358/192.1 |
| 4,405,946 | 9/1983 | Knight | 358/192.1 |
| 4,422,105 | 12/1983 | Rodesch et al. | 358/335 |
| 4,435,842 | 3/1984 | Mayumi et al. | 369/7 |
| 4,475,153 | 10/1984 | Kihara et al. | 369/19 |
| 4,519,003 | 5/1985 | Scholz | 358/335 |
| 4,527,204 | 7/1985 | Kozakai et al. | 360/33.1 |

FOREIGN PATENT DOCUMENTS 27-118190 10/1952 Japan.
48-74988 10/1973 Japan.

OTHER PUBLICATIONS

"A Programmable TV Receiver by Kokado et al. (appearing in the IEEE Transactions on Consumer Electronics for Feb. 1976).
A pamphlet describing a Viewdata Service known under the Trademark of Prestel.
The RCA Basic Service Data for the Selectavision Video Disc System Model SJT400 (p. 42).
RCA Owner's Manual for Selectavision Video Disc SJT400 pp. 14–28.
Pages 1–7 of the instructions manual for the Model NV-P180 VCR manufactured by Matsushita.
U.S. patent application Ser. No. 671,205 filed Mar. 29, 1976.
U.S. patent application Ser. No. 586,271 filed Mar. 5, 1984.

Primary Examiner—Raymond F. Cardillo
Assistant Examiner—Robert A. Weinhardt
Attorney, Agent, or Firm—Eugene M. Whitacre; Paul J. Rasmussen; Peter M. Emanuel

[57] ABSTRACT

Programming apparatus for a scheduler of a television receiver or VCR for automatically tuning the system to channels corresponding to future programs requires, in its simplest form, only a single programming key for initiating the programming operation and digit keys for normally entering channel numbers. This is made possible by apparatus for displaying on the screen of the television receiver or, in the case of a VCR, an associated television receiver or monitor step-by-step instructions for entering the scheduling information. In response to pushing the programming key, a numbered list (or "menu") of various possible programming modes, e.g., scheduling programs to be selected only once, scheduling programs to be selected on a daily basis or scheduling programs to be selected on a weekly basis, is displayed. Thereafter any of the programming modes can be initiated by pushing the appropriate digit key. Thereafter, the user is prompted to push appropriate digit keys to enter the starting and ending times and channel numbers of programs to be scheduled until blanks following descriptive titles of the data that is to be entered are filled in.

21 Claims, 11 Drawing Figures

TELEVISION SYSTEM SCHEDULER WITH ON-SCREEN MENU TYPE PROGRAMMING PROMPTING APPARATUS

The present invention concerns a "scheduler" for programming a television receiver or video cassette recorder to automatically select programs identified by respective channel numbers and starting and ending times for future viewing or recording.

Many video cassette recorders (VRCs) and some television (TV) receivers include a "scheduler" for causing programs occurring at future times to be automatically selected for recording or viewing. Basically, a scheduler includes a clock for indicating the present time and plurality of memory locations in which the starting and ending times and the channel numbers of corresponding programs have previously been stored during a programming operation. When a comparator determines the present time has reached the starting time of a program, the VCR or TV is turned on and the corresponding channel number is caused to be read from the associated memory location and used to tune the respective channel. WHen the present time reaches the ending time, the VCR or TV is turned off.

In the case of a VCR, the programming apparatus has heretofore, for the most part, included pushbutton switches for selecting respective memory locations in which the starting and ending times and channel numbers of the programs are stored. The times and channel numbers are typically entered by activating digit keys of a calculator-type keyboard. The digit keys are normally used to select channels. A mode switch may be provided for selecting various scheduling modes, e.g., including a mode for recording a program only once, a mode for recording the same program each day of the week and a mode for recording the same program week after week. Typically, light emitting diodes (LED) display or a liquid crystal display (LCD), are used to indicate the various programming operations and to guide or "prompt" the user to enter scheduling information.

For cost reasons, it is desirable to limit the number of switches and indicators for controlling a television receiver or VCR. Limiting the number of control switches is also important if the switches are to be located on a remote control transmitter unit. To limit the number of switches, it has been suggested to use the same switches for the programming operation as are used for normal operations. However, it has been found that when multi-function use is made of switches, the user can easily be confused unless detailed prompting information is displayed to guide the user. In the case of a VCR, the amount of prompting information that can be displayed is limited because of the limited number of characters that can be displayed by light emitting diodes or a liquid crystal display.

In the case of a TV, prompting information for guiding a user during the programming of a scheduler may be displayed on its screen. Since a very large number of characters can be displayed, the prompting information may be provided in great detail. However, prior programming apparatus for a TV scheduler employing an on-screen display (OSD) character generator for displaying prompting information still have a relatively large number of programming switches in addition to the switches required to control the normal operation of the TV because the manner in which the prompting information is displayed is not well suited to the multifunction use of switches for both controlling the normal operation of the TV and programming its scheduler.

The present invention is directed to an on-screen programming prompting apparatus for a television system such as a TV or VCR which makes possible the need for only a single "program" key for initiating and terminating the programming operation and a number of "digit" keys which are normally used for channel selection and, possibly, a clear key for cancelling previously entered information, for programming a scheduler. Specifically, in accordance with the the present invention, a character generator is responsive to the activation of a program key to generate character representative coded signals for displaying on the screen of an image reproducing device such as, a picture tube, a programming "menu" or list in which scheduler programming modes, such as e.g., clock setting, scheduling programs to be selected only once, scheduling programs to be selected daily and scheduling programs to be selected weekly, have respective identifying numbers. Thereafter, in response to the activation of digit keys, corresponding programming modes are initiated. According to another aspect of the invention, in each programming mode the character generator is caused to generate character representative coded signals for displaying step-by-step programming instructions which prompt the user to activate digit keys in order to fill in displayed blanks for the purpose of entering the channel numbers and starting and ending times of programs to be scheduled.

These and other features of the present invention will be described with reference to the accompanying Drawings in which:

FIG. 1b is a schematic in block form of a television receiver (TV) for use in conjunction with the VCR shown in FIG. 1 which is useful in explaining the scheduler programming operation shown in FIG. 1a;

FIG. 2 is a schematic in block form of a microprocessor used to control the operation of the VCR shown in FIG. 1a;

Figure 3:
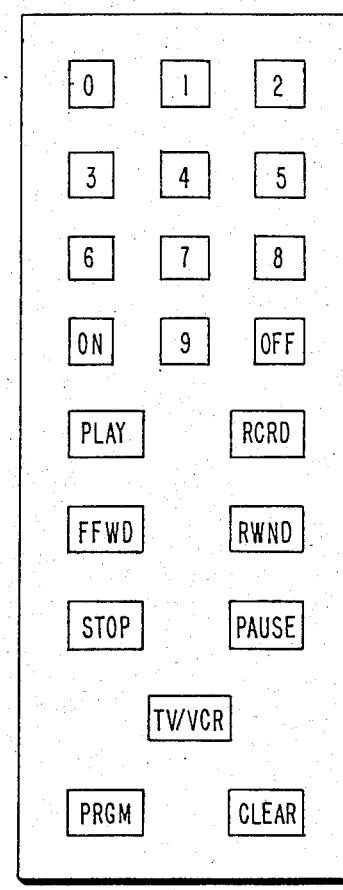

FIG. 3 shows the keyboard of a remote control transmitter for controlling the VCR and scheduler programming apparatus shown in FIG. 1a constructed in accordance with an aspect of the present invention; and FIGS. 4a through 4g show the flow chart for the stored program by which the microprocessor shown in FIG. 3 controls the operation of the scheduler programming apparatus described with reference to FIGS. 1a, 1b and 3.

Figure 1A:
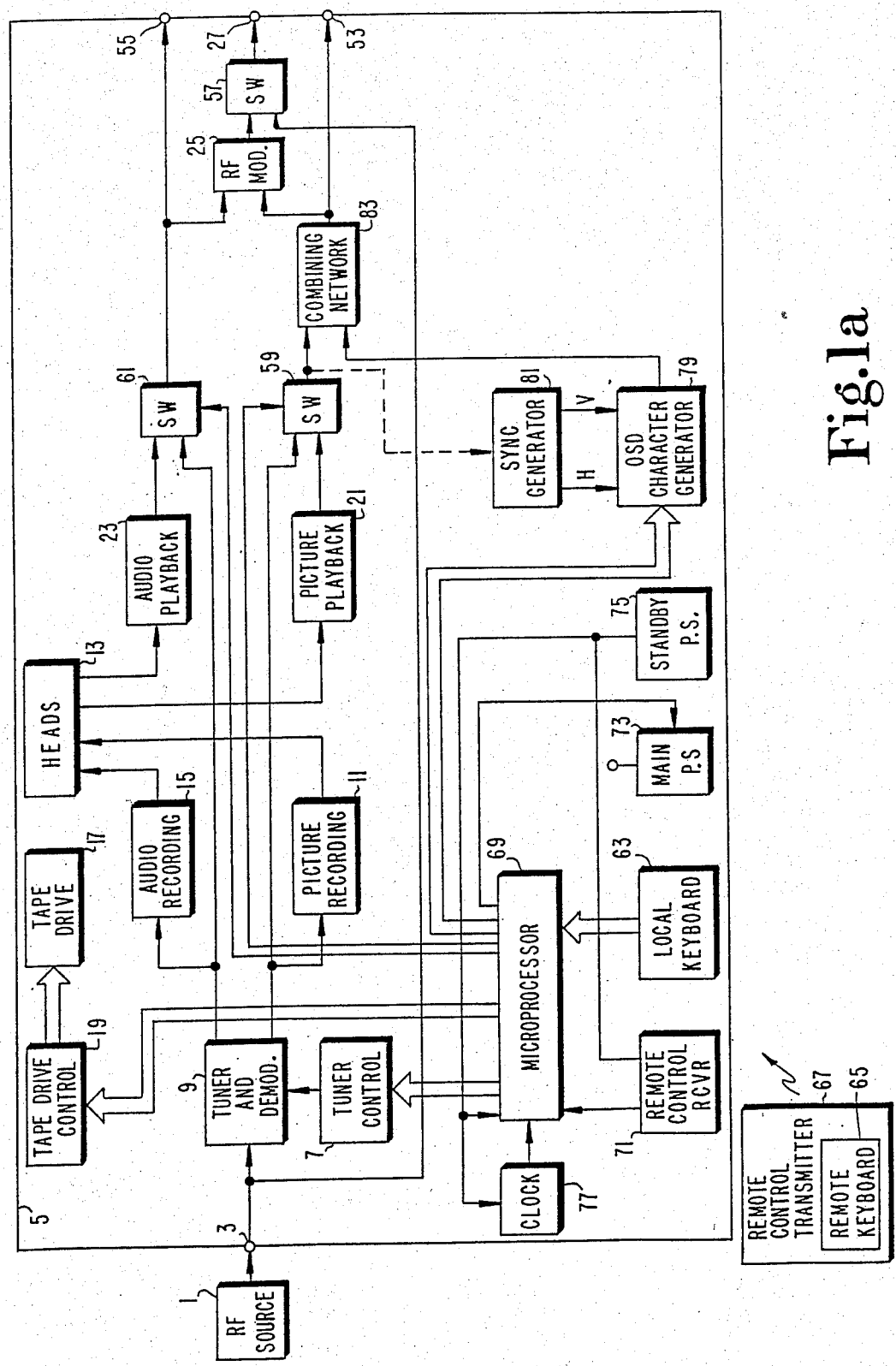
FIG. 1a is a schematic in block form of a video cassette recorder/player (VCR) including a scheduler and scheduler programming apparatus constructed in accordance with an aspect of the present invention.
Figure 1B:
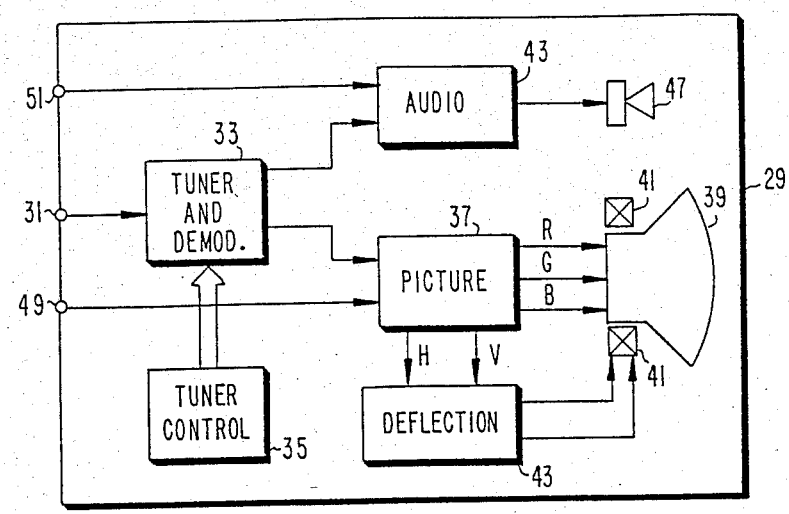

In FIG. 1a, a source 1, such as a broadcast receiving antenna or cable network, provides RF carriers modulated with television information corresponding to various respective channels to an RF input 3 of a video cassette recorder/player (VCR) 5. The RF signal corresponding to a particular channel, selected by a tuner control unit 7, is filtered, heterodyned and demodulated by a tuner and demodulator unit 9 to produce a composite video signal, including luminance, chrominance and synchronization components, and an audio signal corresponding to the selected channel.

In a recording mode of operation, the luminance, chrominance and synchronization components are processed by a picture recording unit 11 and the resultant components are recorded on a magnetic tape by means of magnetic heads 13. The audio signal is processed for recording by an audio recording unit 15 and coupled to heads 13. The tape, contained in a cassette, is driven past heads 13 by a tape drive unit 17 under the control of a tape drive control unit 19.

In playback mode of operation, video and audio signals developed by heads 13 from a tape are processed by respective playback processing units 21 and 23 and coupled to an RF modulator 25. Modulator 25 produces an RF carrier corresponding to a predetermined channel (e.g., channel 3 or 4) which is modulated with television information corresponding to the recorded material in the same format as the RF carriers received from RF source 1. The RF carrier produced by modulator 25 is coupled to an RF output 27 of VCR 5 from which it can be coupled to a television receiver (TV) such as TV 29 shown in FIG. 1b.

The RF carrier supplied to TV 29 by VCR 5 is coupled via an RF input 31 to a tuner and demodulator unit 33, where, under the control of a tuner control unit 35, it is filtered, heterodyned and demodulated to produce a composite video signal and an audio signal corresponding to the recorded material. The composite video signal is processed by a picture processing unit 37 to form red, green and blue (R,G and B) color signals which are coupled to electron guns of a picture tube 39. The electron beams produced by picture tube 39 are swept in a raster by deflection coils 41 in response to horizontal and vertical deflection signals generated by a deflection unit 43 to form a picture on the screen of picture tube 39 corresponding to the recorded material. The deflection signals are generated in response to horizontal (H) and vertical (V) synchronization signals derived from the composite video signal by a sync separator portion of picture processing unit 37. The audio signal is processed by an audio processing unit 43 and coupled to a speaker 47 to produce an audio response corresponding to the recorded material.

Often television receivers and television monitors (i.e., a television receiver without a tuner) have direct video and audio inputs such as 49 and 51, respectively, of TV 29 for receiving baseband video and audio signals from a VCR, home computer or the like. To accommodate such direct signal inputs, VCR 5 includes direct video and audio outputs 53 and 55 coupled to the outputs of picture and audio playback units 21 and 23, respectively.

In order that a user may view (and listen to) one program while a different program is being recorded, a switch 57, usually referred to as a TV/VCR switch, is provided to couple either RF input terminal 3 of VCR 5 or the output of RF modulator 25 to RF output terminal 27.

In order that a user may view (and listen to) the same program that is being recorded, during the recording mode, the video and audio signals produced by tuner and demodulator unit 9 are coupled to RF modulator 25 through switches 59 and 61, respectively. During the playback mode, the video signal produced by picture playback unit 21 and the audio signal produced by audio playback unit 23 are coupled to RF modulator through switches 59 and 61, respectively.

Switches 59 and 61 have the additional function of decoupling the video and audio signals produced at the outputs of tuner and demodulator unit 9 and playback units 21 and 23, from the inputs of RF modulator 25 and direct outputs 53, respectively, while VCR 5 is in a "stop" mode in which VCR 5 is "on" but the tape and tape heads 13 not in motion, a "fast forward" mode, in which the tape is being rapidly driven in the forward direction, in a "rewind" mode, in which the tape is rapidly being driven in the reverse direction and in a "pause" mode, in which the tape is not in motion but tape heads are in motion. The stop mode is provided so that tape motion can be stopped when changing tape direction and between the recording and playback operations. The pause mode is provided so that the recording or the playback mode can be temporarily interrupted and then rapidly reinitiated. The decoupling action may including blanking the video signal and muting the audio signal. Decoupling the video and audio signals from the television receiver during the stop, fast forward and rewind modes prevents the generation of annoying, spurious picture and audio responses.

Various functions of VCR 5 can be controlled by a user by means of either a local keyboard 63 mounted on VCR 5 itself or a remote keyboard 65 mounted on a remote control transmitter 67. Each of keyboards 63 and 65 include a plurality of normally opened push button switches. Each of the pushbutton switches is closed when a user pushes an associated key and automatically returns to the normally opened condition when the user releases the associated key. When a key of local keyboard 63 is pushed, a corresponding coded signal is coupled to a microprocessor 69. When a key of remote keyboard 65 is pushed, a remote control message is transmitted in the form of a digitally modulated infrared or ultrasonic carrier to a remote control receiver 71 which converts it to a correspondingly modulated electrical carrier. Remote control receiver 71 also demodulates the modulated electrical carrier to form a digital word representing the remote control message which is coupled in serial form to microprocessor 69.

A main power supply 73, which is selectively couped to the AC line to turn VCR 5 "on" and decoupled from the AC line to turn VCR 5 "off", supplies operating voltages to all the units of VCR 5 except to microprocessor 69 and remote control receiver 71. The latter units receive their operating voltages from a standby power supply 75 which is continually connected to the AC line.

Microprocessor 69 controls the various operation of VCR 5 described above including turning VCR 5 on and off, controlling the selection of channels by way of tuner control unit 7, selecting between the recording and playback modes by controlling switches 59 and 61 and controlling the position of TV/VCR switch 57. In addition, microprocessor 69 generates commands which are coupled to tape drive control unit 17 to select the speed and direction of tape drive in the recording, playback, stop, fast forward and rewind modes.

Microprocessor 69 also controls the automatic selection (i.e., the "scheduling") of programs to be recorded at future times. For this purpose, microprocessor 69 generates a digital word representing the present time, including date, hour and minute, by counting cycles of the output signal of a clock oscillator 77 (or alternative cycles of the AC line voltage) and has a plurality of memory locations (to be discussed with respect to FIG. 2) for storing the starting and ending times, including the date, hour and minute, and channel numbers of programs to be recorded in the future. At each minute of the present time, the memory locations are addressed and the respective starting times are examined. When the present time equals the starting time of a program to be recorded, microprocessor 69 causes VCR 5 to be turned on by sending a "on" control signal to main power supply 73, and causes the tuning of appropriate channel by sending a digital word representing the channel number of the channel to tuner control unit 7. At this time microprocessor 69 also causes the appropriate signals to be coupled to tape drive control unit 17 and to recording units 11 and 15 to place VCR 5 in the recording mode. When the present time equals the ending time of the program, microprocessor 69 causes VCR 5 to be turned off.

Because of the large number of functions to be controlled by microprocessor 69, only those connections of microprocessor 69 related to the scheduling function, with which the present invention is specifically concerned, are shown in FIG. 1.

Figure 2:
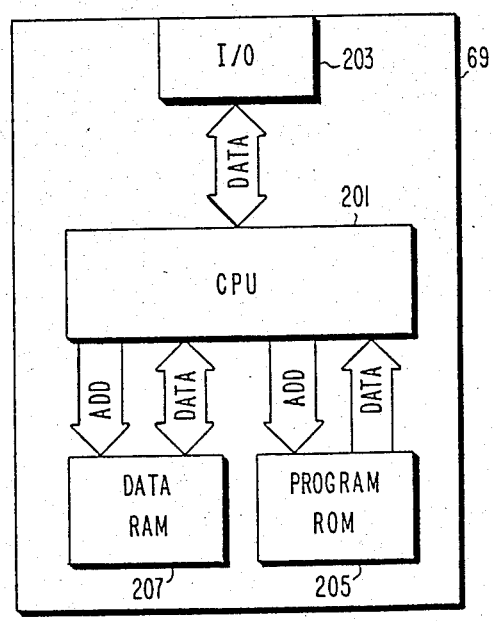

As shown in FIG. 2, microprocessor 69 includes a central processing unit (CPU) 201 which receives data from local keyboard 63 and remote control receiver 71 and supplies data to various portions of VCR 5 through an input/output (I/O) unit 203. CPU 201 processes the data it receives according to a control program stored in a read only memory (ROM) 205. For this purpose, CPU 201 addresses the memory locations ROM 205 and receives instructions from the addressed memory locations. A random access memory (RAM) 207 is used to store data, including the scheduling information, processed by CPU 201. CPU 201 addresses the memory locations of RAM 207 in order to store new data and to retrieve previously stored data. RAM 207 may be included within the same integrated circuit as the remaining portions of microprocessor 69 or may be contained in a separate integrated circuit. The μPD 7591 integrated circuit, including an internal RAM, commercially available from NEC of Japan is suitable for use as microprocesor 69.

To the extent so far described, VCR 5 is similar to already commercially available VCRs such as the model number VJP900 sold by RCA Corporation, Indianapolis, Indiana and described in RCA Service Data File 1983 for the VJP900, second edition. The present arrangement departs from prior VCRs in part because it uses relatively fewer controls for programming the scheduler. This aspect can be better understood with reference to FIG. 3 which shows the keys of keyboard 65 of remote control transmitter 67. Local keyboard 63 includes corresponding keys.

As shown in FIG. 3, keyboard 65 includes ON, OFF, TV/VCR, PLAY, RCRD (ReCoRD), FFWD (Fast ForWarD), RWND (ReWiND) STOP and PAUSE keys for controlling the VCR functions described above. In addition, keyboard 65 also includes keys corresponding to the digits 0 through 9 which are normally used to select channels. To select a channel, the user depresses in sequence, the key corresponding to tens digit of the channel number and thereafter the key corresponding to the units digit of the channel number. The digit keys are also used, as will be explained below, during the scheduler programming operation. Finally, PRGM (PRoGraM) and CLEAR keys are provided for initiating and ending the programming operation and for "clearing" previous entries during the programming operation, respectively.

There are a number of modes during the programming operation. These are:
1. a "clock set" mode for setting the date, hour and minute of the present time;
2. a "normal program" mode for scheduling a particular program to be recorded only once;
3. a "daily program" mode for scheduling a program that occurs at the same time of day Monday thru Friday to be recorded Monday thru Friday;
4. a "weekly program" mode for scheduling a program that occurs at the same day of the week and at the same time of the day each week to be recorded each week; and
5. a "program review" mode for reviewing what has been scheduled.

Even though there are five programming modes, the digit keys and the PROGRAM and CLEAR keys are the only keys that are required to be operated by the user for the programming operation.

To enable the scheduler to be programmed in the various modes with only the PROGRAM, digit and CLEAR keys, VCR 5 includes provisions for displaying detailed instructions on the screen of an associated television receiver such as TV 29 or television monitor for guiding the user through the programming operation in a simple step-by-step procedure. For this purpose, VCR 5 includes an on-screen display (OSD) character generator 79 for generating signals representing alpha-numeric characters in a video format suitable for displaying the characters on the screen of a television receiver or monitor. The MB88303ES integrated circuit manufactured by Fujitsu of Japan is a suitable for this purpose. Character generator 79 responds to command signals generated by microprocessor 69 to generate the character representative signals. Microprocessor 69 is responsive to the operation of the keys of local keyboard 63 or remote keyboard 65 to generate the command signals for character generator 79 as will be explained in detail below.

A synchronization ("sync") signal generator 81 generates horizontal (H) and vertical (V) sync pulses which are coupled to character generator 79 for positioning the characters on the screen of a television receiver or monitor. The character representative signals are coupled by way of a signal combining circuit 83 to the video input of RF modulator 25. The normal video signal is also coupled through combining network 83 to RF modulator 25. Combining network 83 may simply comprise a resistive signal adder (or matrix). Modulator 25 modulates the RF carrier at the predetermined frequency with the character representative signals in the same manner as it does with the normal video signal. In the television receiver, after demodulation, the character representative signals are processed in the same manner as normal video signals and the corresponding characters are displayed on the screen of the picture tube. The character representative signals generated by character generator 79 are also coupled by combining network 83 to direct video output 53 of VCR 5 to accommodate the use of a television receivers and television monitors with direct video inputs.

While the programming instructions can be displayed incorporated with a normal image so that a user can continue to view a program during the programming operation, because there are a large number of characters displayed and because the instructions are displayed over a large part of the screen, it is desirable that the normal picture be absent during the programming operation. Since switch 59 decouples the output of tuner and demodulator unit 9 or picture playback unit 21 from the video input of RF modulator 25 and direct video output 53 during the stop, fast forward and rewind modes, the programming operation can be initiated in these modes. Allowing the programming operation to be initiated during the fast forward and rewind modes is useful since there may be sufficient time during these modes, depending on the amount of tape driven, to complete all or a portion of the programming operation. At any rate, both the fast forward and rewind modes begin and end in the stop mode.

Since a normal video signal with synchronization components is not present during the stop, fast forward and rewind modes, sync generator 81 includes a free running oscillator from which the horizontal (H) and Vertical (V) synchronization pulses are derived. If it is desired to also display the programming instructions incorporated with a normal image, sync generator 81 should be capable of generating the horizontal (H) and vertical (V) synchronization pulses in synchronization with the synchronization components of a normal video signal produced at the output of switch 59 during the recording and playback modes. An arrangement including an oscillator which oscillates at the horizontal frequency and is synchronized with the synchronization components of a normal video when a normal video signal is present and which oscillates at the same frequency when a normal video signal is not present suitable for use as sync generator 81 for the purpose set forth above is disclosed in U.S. Pat. No. 4,390,902 (Chin et al.). The vertical (V) synchronization pulses can be derived by a count-down arrangement from the horizontal (H) pulses produced by the oscillator.

The procedure to be followed by a user to program the scheduler of VCR 5 will now be described with reference to the control program of microprocessor 69 for causing information to be displayed on the screen of an associated television receiver or monitor. The numbers in brackets in the following description correspond to portions of the flow chart of the program shown in FIGS. 4a through 4g.

Figure 4A:
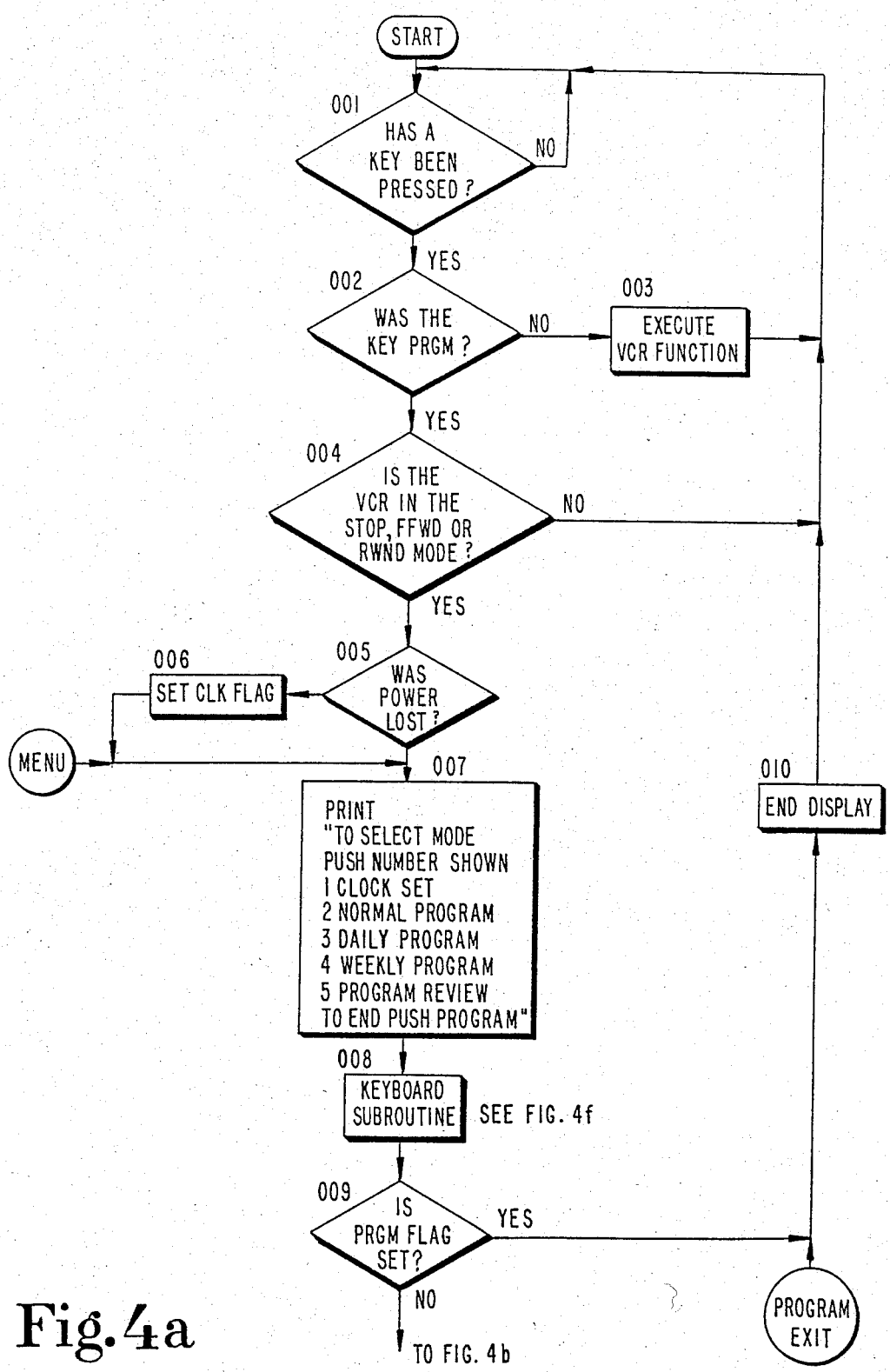

With reference to FIG. 4a, if VCR 5 is in the stop, fast forward or rewind mode, a user may initiate the scheduler programming operation by pressing the PRGM key [001–004]. At the beginning of the programming operation, microprocessor 69 determines if standby power was lost and sets an indicator flag (CLK) if it was [005–006]. The loss of standby power may be detected by comparing a predetermined data word generated under program control with one stored in RAM 207. The data word stored in RAM 207 should correspond to the program derived data word if power was not lost. The purpose of this will be described later. As is known the loss of power may also be determined by a "power-up detector" which detects the initial return of power by sensing the supply voltage.

Thereafter, microprocessor 69 causes character generator 79 to generate character signals for displaying a programming mode list on the screen of the associated television receiver or monitor [007]. The list appears as follows:

---
TO SELECT MODE
PUSH NUMBER SHOWN
1 CLOCK SET
2 NORMAL PROGRAM
3 DAILY PROGRAM
4 WEEKLY PROGRAM
5 PROGRAM REVIEW
TO END PUSH PROGRAM

---

This list, with each of the various programming modes identified by a respective number, is a "menu" for allowing the user to select the appropriate programming mode. To select any one of the modes, the user merely has to push the corresponding digit key. A keyboard entry subroutine is initiated [008] to wait for the user to push a key. The keyboard entry subroutine will now be described with reference to FIG. 4f.

After the generation of a display, such as the menu, prompting a user to enter information, the keyboard entry subroutine allows a predetermined amount of time for the user to push the appropriate key and if a key is not pushed in the predetermined time, the programming operation is terminated, the last display is ended and VCR 5 is caused to return to its normal operation [069–070 PROGRAM EXIT]. The keyboard entry subroutine also determines if one of the PRGM or CLEAR keys has been pushed and sets a corresponding flag, PRGM or CLR, respectively, if one has been pushed [067,071–074]. The PRGM and CLR flags are used in the main program as is described below.

Again, with reference to FIG. 4a, if the PRGM key is pushed after the menu has been displayed, the programming mode ends, the last display is ended and VCR 5 returns to its normal operation [009,010,003]. Now with reference to FIG. 4b, if the "1" digit key is pushed after the menu has been displayed, the "clock set" mode is initiated [011]. If the "1" digit key is not pushed, the "clock set" mode is initiated anyway, if the CLK flag has been set to indicate the loss of power [012]. The purpose of the latter is to ensure that the present time is correctly set before any programs are scheduled.

The clock set mode will now be described with reference to FIG. 4c. If the "1" digit key was pushed, character generator 79 is caused to generate character signals for displaying the following [020,022]:

---
CLOCK SET
TIME —:—
TO END PUSH PROGRAM

---

If the CLK flag was set, the following is caused to be displayed [021,022]:

---
PLEASE SET CLOCK
TIME —:—
TO END PUSH PROGRAM

---

These displayed instructions guide or prompt the user to sequentially push the digit keys to fill in the blanks in order to enter the hour and minute of the present time. A display updating routine is initiated [023] during this portion of the operation. The flow chart for a typical updating routine is shown in FIG. 4g.

Figure 4B:
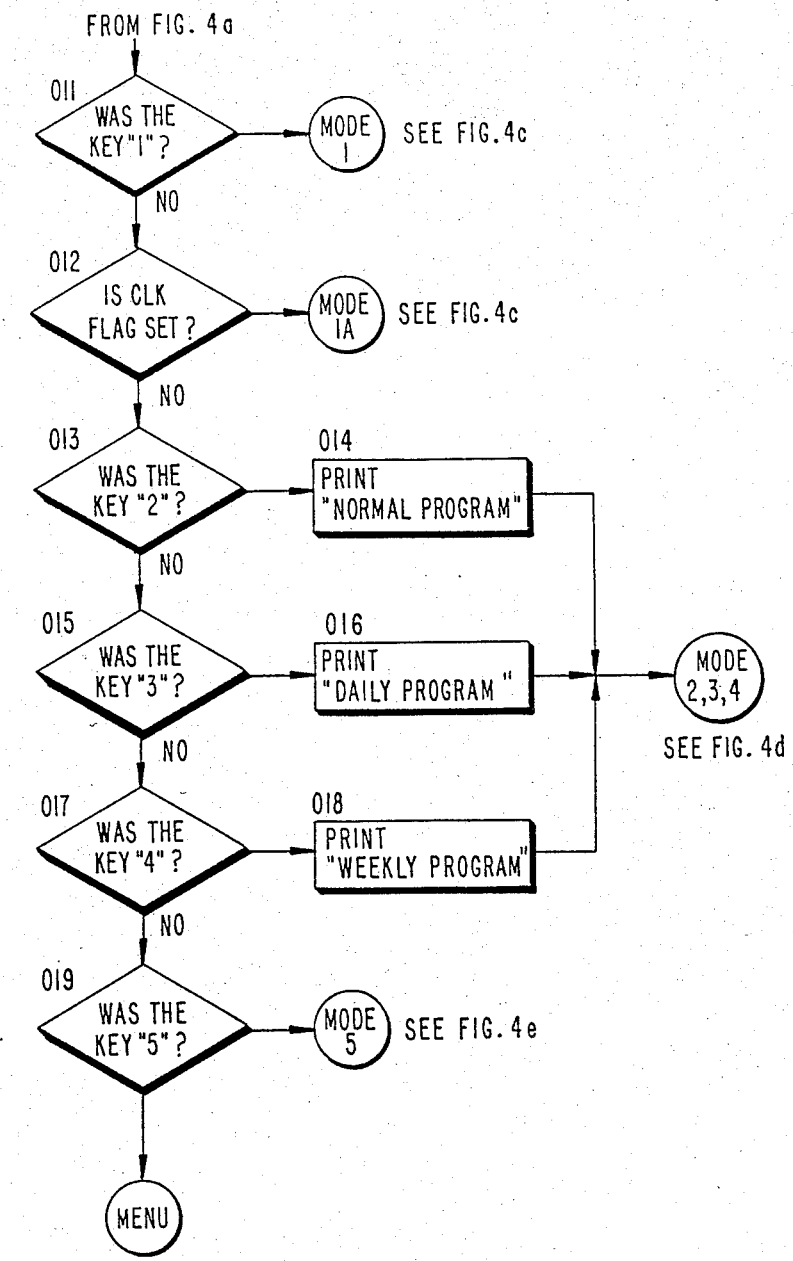
Figure 4C:
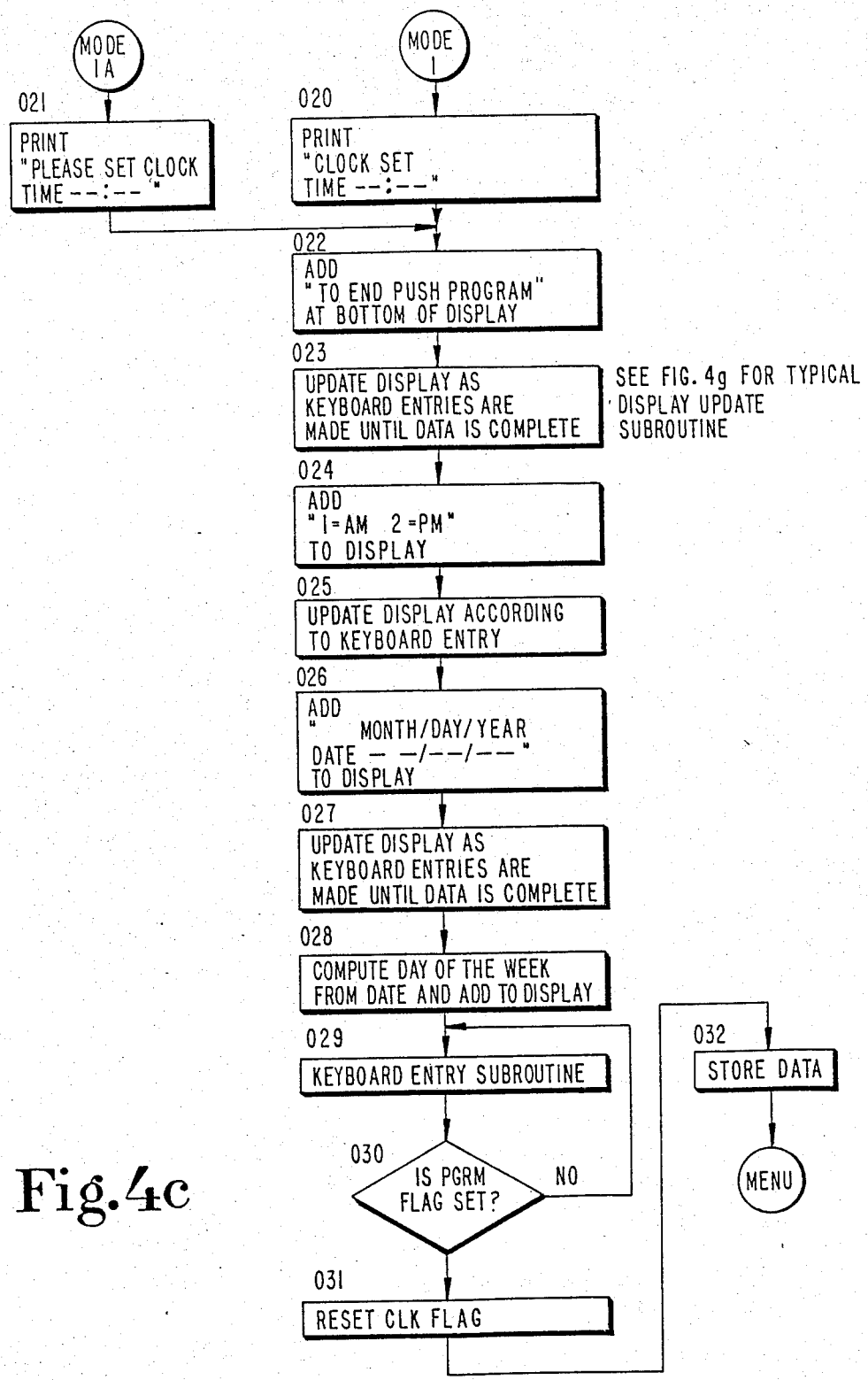
Figure 4D:
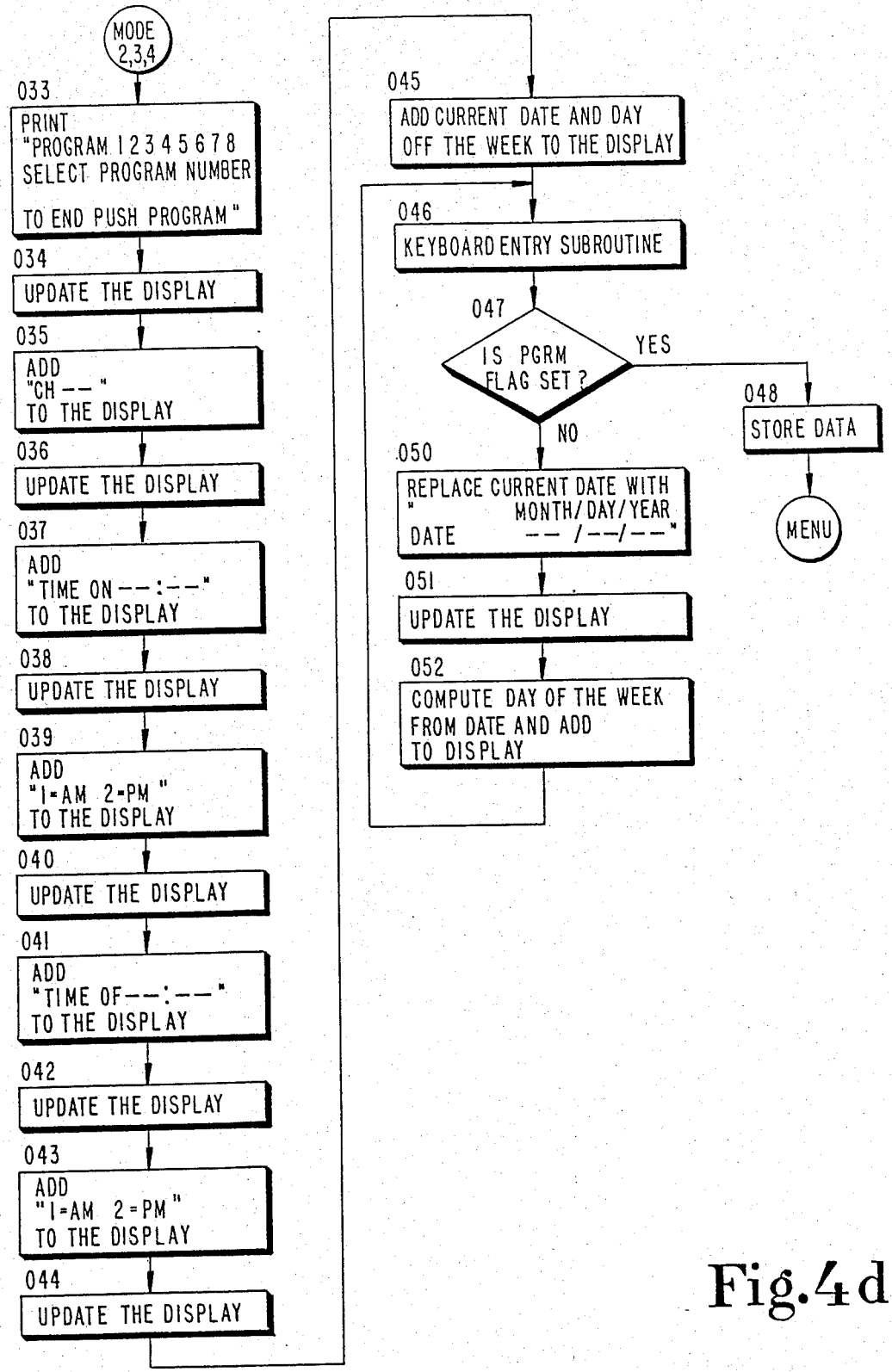
Figure 4E:
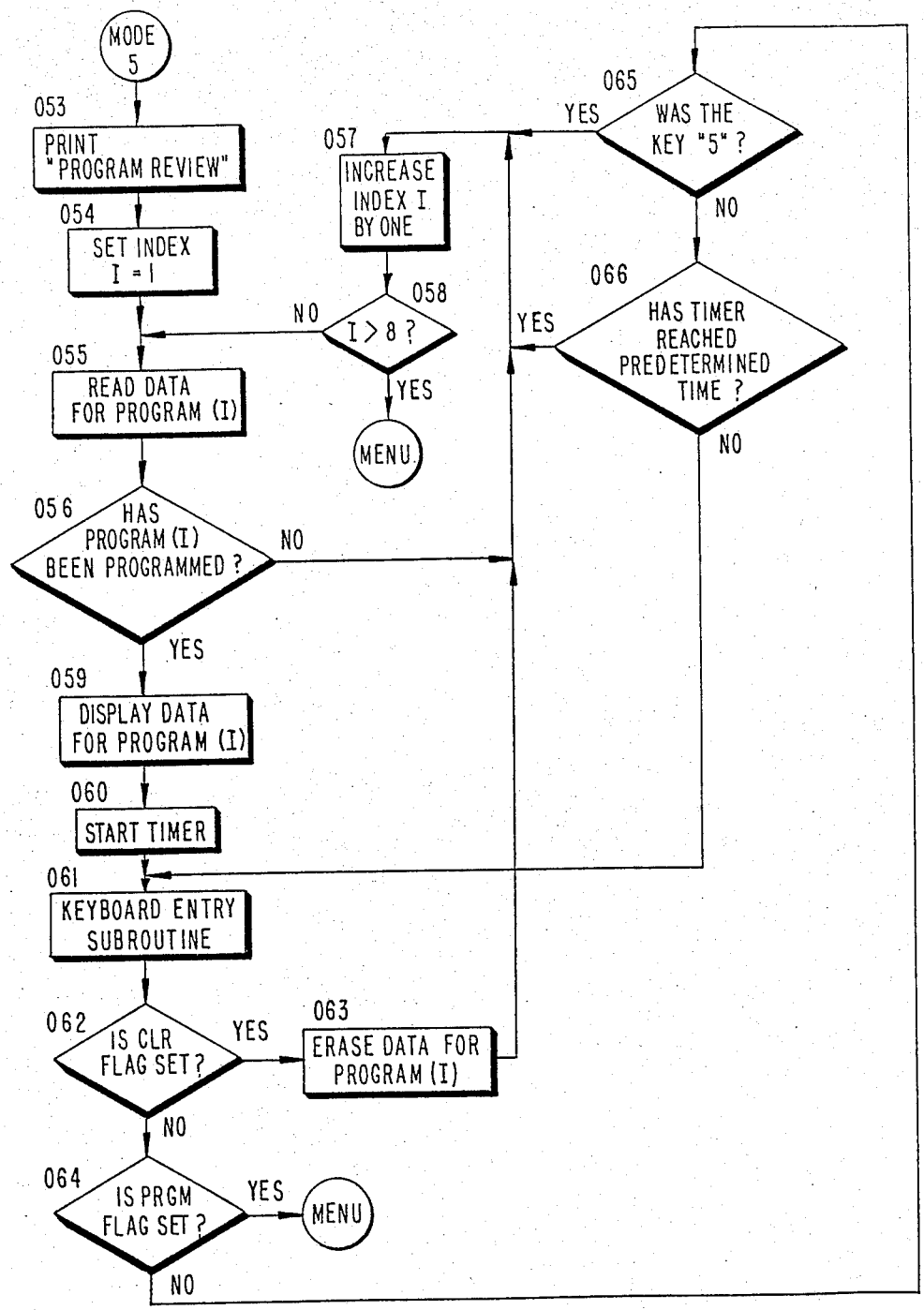
Figure 4F:
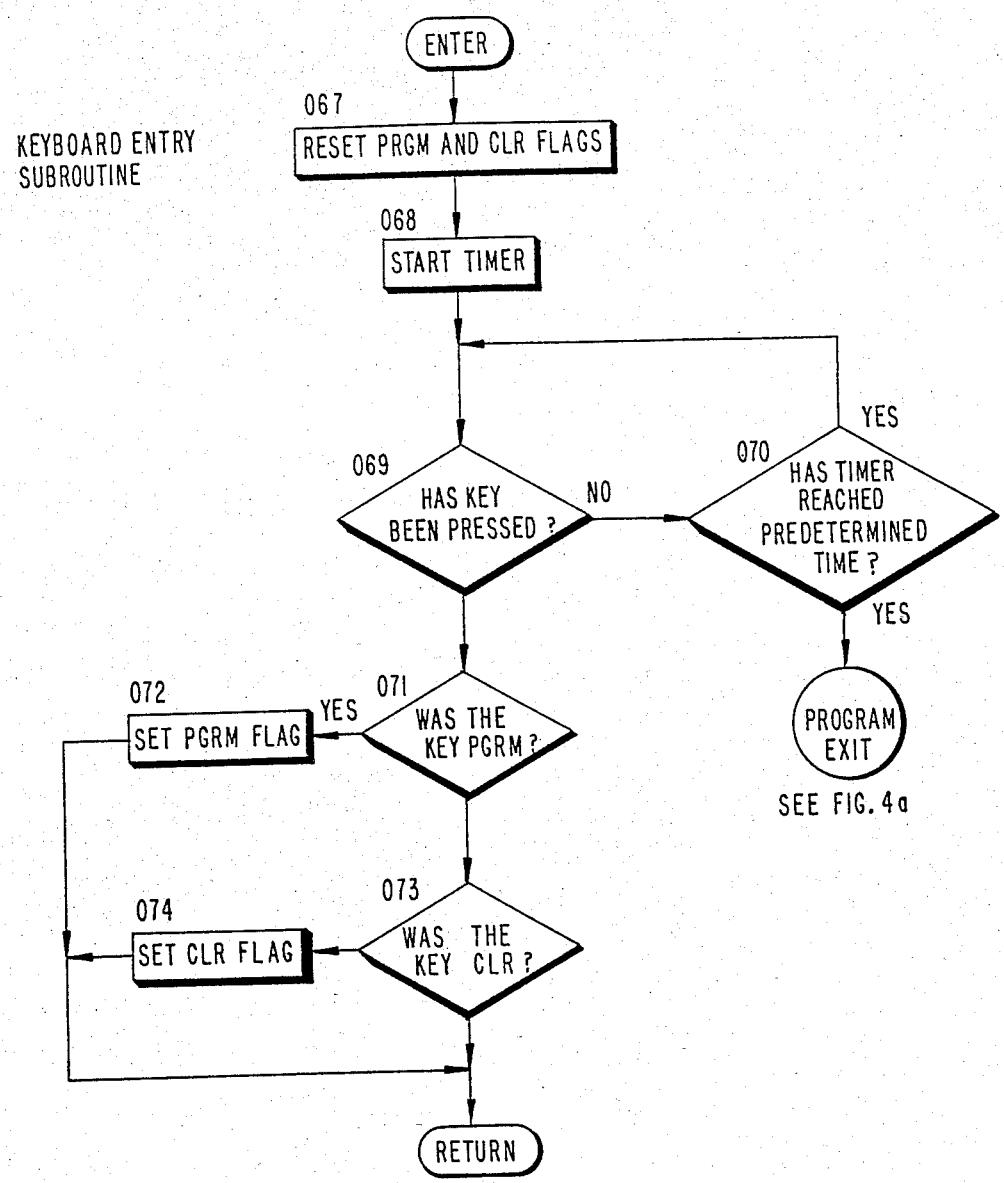
Figure 4G:
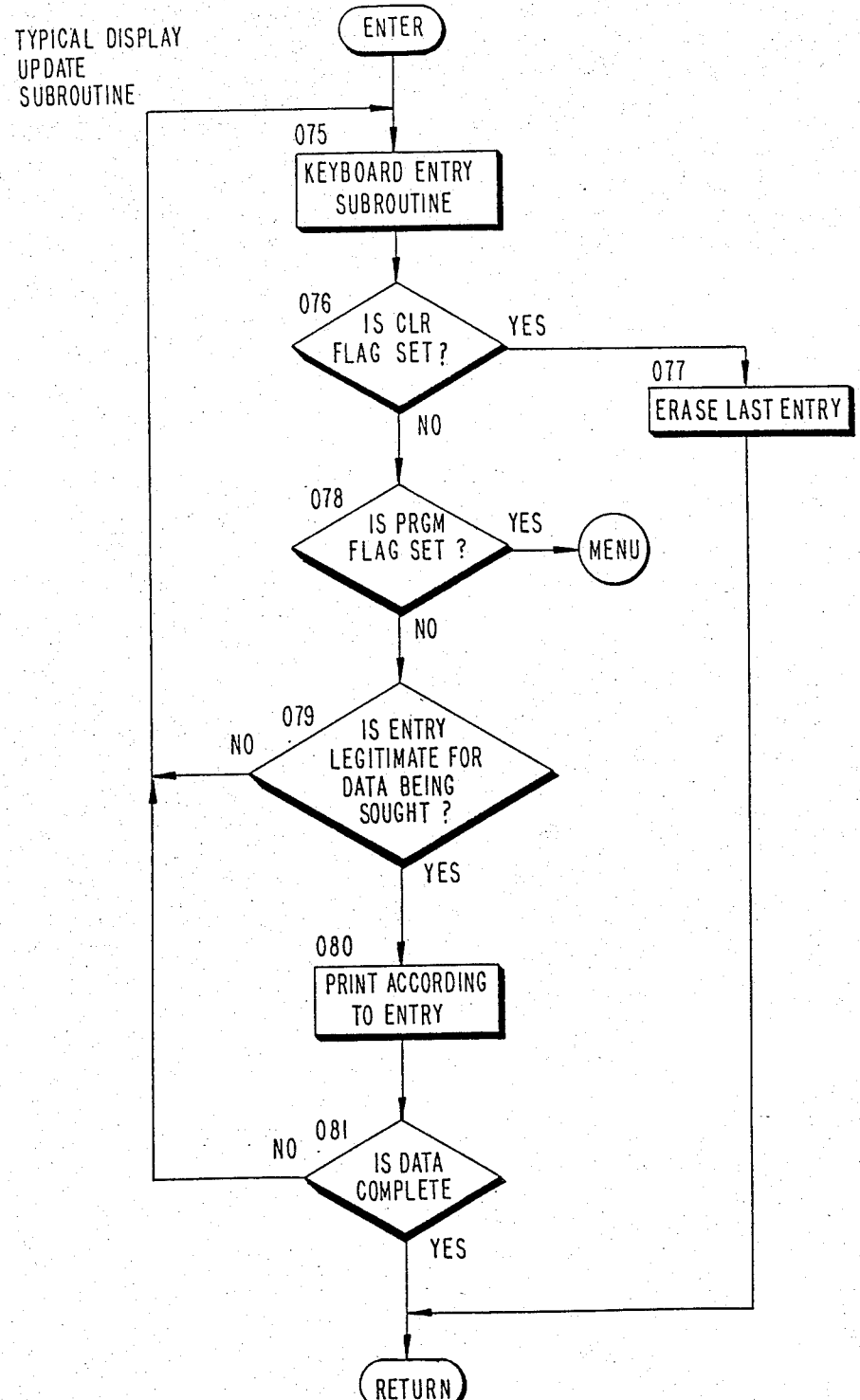

With reference to FIG. 4g, as digit keys are pushed, the blanks are replaced with the appropriate digits until the data is complete [080,081]. If the key pushed is inappropriate, e.g., in the clock set mode if the key pushed does not correspond to a legitimate hour or minute, no action is taken [079]. If a user has made a mistake and entered the wrong digit, the last entered digit can be erased by pushing the CLEAR key [076,077]. If the PRGM key was pushed, the menu is again caused to be displayed [078]. In the latter case, the information entered thus far is not stored.

Again with reference to FIG. 4c, when the last digit of the time has been entered, the following is caused to be displayed [024]:

---
CLOCK SET
TIME 10:17
1=AM 2=PM
TO END PUSH PROGRAM
---

This displayed instruction prompts the user to push the appropriate digit key for selecting AM or PM. When this has occurred, the following is caused to be displayed [025,026]:

---
CLOCK SET
TIME 10:19 AM
MONTH/DAY/YEAR
DATE —/—/—
TO END PUSH PROGRAM
---

This prompts the user to enter the date by sequentially pushing the appropriate digit keys. As the digit keys are depressed the blanks are replaced by the appropriate digits [027]. When the date has been completed, microprocessor 69 computes the day of the week from a 100 year calendar stored in ROM 205 and causes the following to be displayed [028]:

---
CLOCK SET
TIME 10:21 AM
DATE 12/13/83
WEDNESDAY
TO END PUSH PROGRAM
---

At this point, if the user pushes the PROGRAM key, the entered information is stored, the CLK flag is reset and the menu is again caused to be displayed [029–032].

With reference to FIGS. 4b and 4d, if when the menu is displayed, the user pushes the "2" digit key, the "normal program" mode is initiated [013] and the following is caused to be displayed [014,033]:

---
NORMAL PROGRAM
PROGRAM 12345678
SELECT PROGRAM NUMBER
TO END PUSH PROGRAM
---

Since there are only a limited number, e.g., 8, of programs that can be scheduled, due to the limited size of RAM 207, this display instructs a user to select a particular memory location (identified to the user as a "program number") for the particular program to be scheduled. In the above display, the program numbers which are not aleady utilized for previously selected programs may be made to flash to signify the available program numbers.

With reference to FIG. 4d, After the user has pushed a digit key to select a program number (e.g., 4) the following is displayed [034,035].

---
NORMAL PROGRAM
PROGRAM 4
CH —
TO END PUSH PROGRAM
---

This prompts a user to enter the channel number (e.g., 13) of the channel of the program. When this has been done, the following is displayed [036,037]:

---
NORMAL PROGRAM
PROGRAM 4
CHANNEL 13
TIME ON —:—
TO END PUSH PROGRAM
---

This display prompts the user to enter the starting time of the program. When the user has entered the starting time of the program, the display is changed to prompt the user to select whether the starting time is AM or PM by displaying the following [038,039]:

---
NORMAL
PROGRAM 4
CHANNEL 13
TIME ON 8:00
AM=1 PM=2
TO END PUSH PROGRAM
---

Thereafter, the user is prompted by the display to enter the ending time in the same manner as the starting time. When this has been done, the following is displayed [040–045]:

---
NORMAL PROGRAM
PROGRAM 4
CHANNEL 13
TIME ON 8:00 PM
TIME OFF 9:00 PM
DATE 12/16/83
FRIDAY
TO END PUSH PROGRAM
---

It is noted that in the above display, the present date and day of the week is displayed. This is so because it is felt that most users will program the scheduler on the same day that the program they wish to record occurs. At this point, if the PRGM key is pushed, the information for the selected program number will be stored in the selected memory location and the menu is again displayed [046–048]. If however, the PRGM key is not pushed, the following will be displayed [050]:

---
NORMAL PROGRAM
PROGRAM 4
CHANNEL 13
TIME ON 8:00 PM
TIME OFF 9:00 PM
DATE —/—/—
TO END PUSH PROGRAM
---

This display prompts a user to enter the date of the program to be recorded in the case where that date is not the present date. When the date has been filled in, the day of the week is calculated by microprocessor 69 and the following is displayed [051,052]:

---
NORMAL PROGRAM
PROGRAM 4
CHANNEL 13
TIME ON 8:00 PM
TIME OFF 9:00 PM
DATE 01/25/84
WEDNESDAY
---

-continued

```
TO END PUSH PROGRAM
```

When the PRGM key is pushed, the entered information is stored in the memory location for the selected program number and the menu is again displayed [047,048].

Referring again to FIG. 4b, the programming for the "daily" and "weekly" modes are initiated by pushing the "3" and "4" digit keys, respectively, while the menu is displayed [015,017]. The displays are essentially the same as that for the "normal" mode except that each is identified at the top of the display by the appropriate title, i.e., "DAILY PROGRAM"[016] and "WEEKLY PROGRAM" [018]. To generate the displays for the "daily" and "weekly" modes the same portion of the program used for the displays in the "normal" mode, the flow chart of which is indicated in FIG. 4d, is used.

To enter the "program review" mode, the user pushes the "5" digit key when the menu is displayed [019]. With reference to FIG. 4e, this causes the scheduling information for program 1, e.g., to be displayed in the following manner [053–55,59]:

```
NORMAL PROGRAM
CHANNEL 08
TIME ON 06:30 PM
TIME OFF 09:45 PM
DATE 01/27/84
FRIDAY
TO ERASE PUSH CLEAR
TO END PUSH PROGRAM
```

If the user wishes to erase a particular program selection, the CLEAR key is pushed [061–063]. If no scheduling information for program 1 has been stored, the scheduling information for the first program for which scheduling information has been stored is displayed [056–059]. Thereafter, each time the user pushes the "5" digit key, the scheduling information for the next program is displayed or if the user does not push the "5" digit key within a predetermined time, the scheduling information for the next program is automatically displayed [060,065,066,057,058,055,056,059]. The scheduling information for the next program is also automatically displayed when a program is erased [063,057,058,055,056,059]. When all the program selections (e.g., 8) have been reviewed, the menu is automatically displayed [058]. The menu is also displayed if the user pushes the PRGM key [064].

What is claimed is:

1. In a television system including tuner means for selecting RF signals modulated with picture information corresponding to respective channels; channel selection means for controlling said tuner means including digit switches for selecting channels; demodulation means for demodulating said RF signals to generate a video signal corresponding to said picture information; first coupling means for coupling said video signal to a display device having a screen for displaying an image corresponding to said picture information; and a scheduler including memory means for storing time (including time of day and date) and channel information corresponding to respective programs occurring in the future; clock means for indicating the present time; and scheduler control means for causing said channel selection means to select the channel corresponding to one of said programs when the present time corresponds to the starting time of said one of said programs; programming apparatus for allowing a user to program said schedule in a plurality of programming modes including at least a clock setting mode, a normal mode for scheduling programs for selection only once and a daily mode for scheduling programs for selection on a daily basis, comprising:

character generator means for generating character signals suitable for displaying alpha-numeric characters on said screen of said display device;

second coupling means for coupling said character signals to said display device;

a user operable programming switch; and programming control means responsive to the operation of said programming switch for causing said character generator means to generate character signals for displaying a numbered list of said programming modes and for enabling said digit switches to select said programming modes and thereafter being responsive to the operation of one of said digit switches for causing said character generator to generate character signals for displaying prompting instructions for guiding a user to operate said digit switches to enter numerical information for a respectively numbered one of said programming modes.

2. The combination recited in claim 1, wherein:
said television system is a video tape recorder.

3. The combination recited in claim 2, wherein:
said first coupling means includes modulation means for converting said video and character signals to a correspondingly modulated RF carrier; and
said second coupling means is coupled to said first coupling means and thereby to said display device.

4. The combination recited in claim 1, wherein:
said program switch and said digit switches are incorporated in a remote control transmitter which generates remote control coded messages in response to their operation; and
said programming control means is responsive to said remote control messages to control said character generator means.

5. The combination recited in claim 1, wherein:
said prompting instructions include a descriptive title of the selected programming mode.

6. The combination recited in claim 5, wherein:
said prompting instructions include blanks corresponding to the numerical information to be entered; and
said programming control means is responsive to the operation of said digit switches after the generation of said character signals for displaying said prompting instructions for generating character signals for displaying the digits corresponding to said operated digit switches in place of said blanks.

7. The combination recited in claim 6, wherein:
said programming control means is responsive to a second operation of said program switch to terminate the programming operation.

8. The combination recited in claim 7, wherein: said scheduler programming arrangement further includes a user operable clear switch; and said programming control means is responsive to the operation of said clear switch for canceling said character signals for displaying the digits corresponding to ones of said digit switches operated after the generation of said character signals for displaying said prompting instructions.

9. The combination recited in claim 8, wherein:
said program switch, said digit switches and said clear switch are the only user operated control devices provided for programming said scheduler.

10. The combination recited in claim 9, wherein:
said program control means includes a microprocessor under the control of a stored program.

11. The combination recited in claim 9, wherein:
said television system is a video tape recorder.

12. The combination recited in claim 9, wherein:
said first coupling means includes modulation means for converting said video and character signals to a correspondingly modulated RF carrier; and
said second coupling means is coupled to said first coupling means and thereby to said display device.

13. The combination recited in claim 9, wherein:
said program switch, said digit switches and said clear switch are incorporated in a remote control transmiter which generates respective remote control coded messages in response to their operation; and
said programming control means is responsive to said remote control messages to control said character generator means.

14. In a video recorder including tuner means for selecting RF signals modulated with picture information corresponding to respective channels; channel selection means for controlling said tuner means including digit switches for selecting channels; demodulation means for demodulating said RF signals to generate a video signal corresponding to said picture information; recording means for recording said video signal obtained from said demodulation means; playback means for recovering recorded video signals recorded; output means for coupling one of said video signals obtained from said demodulation means or said playback means to a display device having a screen for displaying an image corresponding to said picture information; and a scheduler including memory means for storing time (including time of day and date) and channel information corresponding to respective programs occurring in the future; clock means for indicating the present time; and scheduler control means for causing said channel selection means to select the channel corresponding to one of said programs when the present time corresponds to the starting time of said one of said programs; programming apparatus for allowing a user to program said scheduler in a plurality of different programming modes including at least a clock setting mode, a normal mode for scheduling programs for recording only once and a daily mode for scheduling programs for recording on a daily basis, comprising:

character generator means for generating character signals suitable for displaying alpha-numeric characters on said screen of said display device;
coupling means for coupling said character signals to said output means;
a user operable programming switch; and
programming control means responsive to the operation of said programming switch for causing said character generator means to generate character signals for displaying a numbered list of said programming modes and for enabling said digit switches to select said programming modes and thereafter being responsive to the operation of one of said digit switches for causing said character generator to generate character signals for displaying prompting instructions for guiding a user to operate said digit switches to enter numerical information for a respectively numbered one of said programming modes.

15. The combination recited in claim 14, wherein:
said output means includes modulation means for converting said video and character signals to a correspondingly modulated RF signal.

16. The combination recited in claim 14, wherein:
said program switch and said digit switches are incorporated in a remote control transmitter which generates respective remote control coded messages in response to their operation; and
said programming control means is responsive to said remote control messages to control said character generator means.

17. The combination recited in claim 14, wherein:
said prompting instructions include a descriptive title of the selected programming mode;
said prompting instructions include blanks corresponding to the numerical information to be entered;
said programming control means is responsive to the operation of said digit switches after the generation of said character signals for displaying said prompting instructions for generating character signals for displaying the digits corresponding to said operated digit switches in place of said blanks;
said programming control means is responsive to a second operation of said program switch to terminate the programming operation;
said scheduler programming apparatus further includes a user operable clear switch; and
said programming control means is responsive to the operation of said clear switch for cancelling said character signals for displaying the digits corresponding to ones of said digit switches operated after the generation of said character signals for displaying said prompting instructions.

18. The combination recited in claim 17, wherein:
said program switch, said digit switch and said clear switch are the only user operated control devices provided for programming said scheduler arrangement.

19. The combination recited in claim 18, wherein:
said program switch, said digit switches and said clear switch are incorporated in a remote control transmiter which generates respective remote control coded messages in response to their operation; and
said programming control means is responsive to said remote conrol messages to control said character generator means.

20. In a television system including tuner selection means for selecting RF signals modulated with picture information corresponding to respective channels; channel selection means for controlling said tuner means including digit switches for selecting channels; demodulation means for demodulating said RF signals to generate a video signal corresponding to said picture information; first coupling means for coupling said video signal to a display device having a screen for displaying an image corresponding to said picture information; and a scheduler including memory means for storing time (including time of day and date) and channel information corresponding to respective programs occurring in the future; clock means for indicating the present time; and scheduler control means for causing said channel selection means to select the channel corresponding to one of said programs when the present time corresponds to the starting time of said one of said programs; programming apparatus for allowing a user to program said schedule in a plurality of programming modes including clock setting mode, a normal mode for scheduling programs for selection only once, a daily mode for scheduling programs for selection on a daily basis and a weekly mode for scheduling programs for selection on a weekly basis, comprising:

character generator means for generating character signals suitable for displaying alpha-numeric characters on said screen of said display device;

second coupling means for coupling said character signals to said first coupling means and thereby to said display device;

a programming switch;

a clear switch;

programming control means responsive to the operation of said programming switch for causing said character generator means to generate character signals for displaying a numbered list of said programming modes and for enabling said digit switches to select said programming modes; and after the generation of characters for displaying said numbered list of said programming modes being responsive to the opeation of one of said digit switches for causing said character generator to generate character signals for displaying prompting instructions for guiding a user to operate said digit switches to enter numerical information for a respectively numbered one of said programming modes, said prompting instructions including a descriptive title of the selected programming mode and blanks corresponding to the numerical information to be entered; and after the generation of said character signals for displaying said prompting instructions, being responsive to the operation of said digit switches for displaying the corresponding digits in place of said blanks; said programming control means being responsive to the operation of said clear switch for cancelling said character signals for displaying the last entered digit; said programming control means being responsive to a second operation of said programming switch to terminate the programming operation of said scheduler.

21. In a television system including input selection means for selecting one of a plurality of television signals each representing respective picture information, input selection control means for controlling said input selection means including numbered switches for selecting said one of said television signals; first coupling means for coupling said one of said television signals to a display device having a screen for displaying an image corresponding to said respective picture inforamtion; and a scheduler including memory means for storing time and input selection information corresponding to respective programs occurring in the future; clock means for indicating the present time; and scheduler control means for causing said input selection means to select the television signal corresponding to one of said programs when the present time corresponds to the starting time of said one of said programs; programming apparatus for allowing a user to program said scheduler in a plurality of programming modes, said programming apparatus comprising:

character generator means for generating character signals suitable for displaying alpha-numeric characters on said screen of said display device;

second coupling means for coupling said character signals to said display device;

a user operable programming switch; and programming control means responsive to the operation of said programming switch for causing said character generator means to generate character signals for displaying a numbered list of said programming modes and for enabling said digit switches to select said programming modes and thereafter being responsive to the operation of one of said numbered switches for causing said character generator to generate character signals for displaying prompting instructions for guiding a user to operate said numbered switches to enter numerical information for a respectively numbered one of said programming modes.

* * * * *